G. P. ROSE, A. CARTWRIGHT & B. S. ROSE.
LET-OFF STRAPS OR BRAKES FOR LOOMS.

No. 173,137. Patented Feb. 8, 1876.

WITNESSES:
J. G. Perry
H. T. Brainerd

INVENTOR:
George P. Rose
Abel Cartwright
Benoni S. Rose

UNITED STATES PATENT OFFICE

GEORGE P. ROSE AND ABEL CARTWRIGHT, OF SLOCUMVILLE, AND BENONI S. ROSE, OF LA FAYETTE, RHODE ISLAND.

IMPROVEMENT IN LET-OFF STRAPS OR BRAKES FOR LOOMS.

Specification forming part of Letters Patent No. 173,137, dated February 8, 1876; application filed May 14, 1875.

*To all whom it may concern:*

Be it known that we, GEORGE P. ROSE and ABEL CARTWRIGHT, of Slocumville, and BENONI ROSE, of La Fayette, all in the county of Washington and State of Rhode Island, have invented an Improvement in Friction Straps or Brakes for Let-Off Motion for Looms, of which the following is a specification:

The object of this improvement is to provide a let-off friction strap or brake for looms that shall be unaffected by atmospheric changes, and not liable to gather gum or become clogged.

Figure 1:
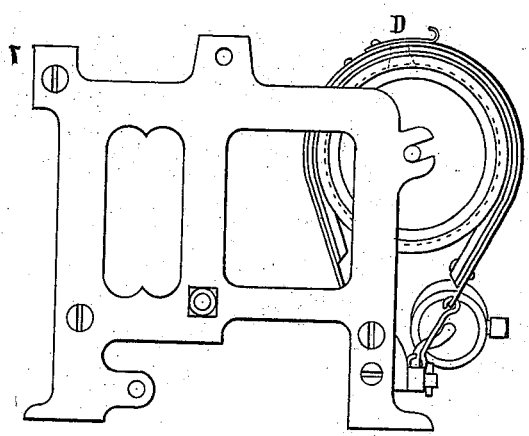
Figure 2:
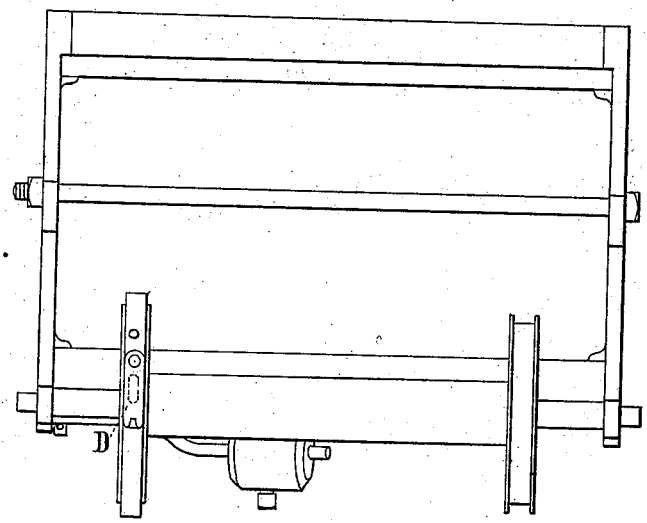
Figure 3:
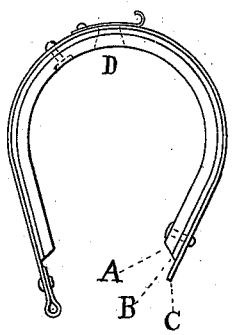

Figure 1 represents an end view of the loom-frame, with the yarn-beam and the improved friction strap or brake on one of its heads or friction-rollers. Fig. 2 is a plan or top view of the same. Fig. 3 is a side view of this improved friction strap or brake, showing the layers of which it is composed—A, wood; B, rubber; C, iron; and D the lubricating-orifice through them.

It is well known that leather and iron let off friction straps or brakes used with metallic beam-heads produce electricity by the friction between them; that they gather moisture and gum, causing strong cohesion of the parts; to prevent which we use a strap or brake composed of wood, manila, hemp, or any other kindred material that is non-conducting of such matters, for the inner layer, and wrought-iron, steel, or other suitable material for the outer layer, to give strength and durability to the whole. Vulcanized india-rubber, crimped metal, cork, canvas, or other suitable material, may be used between the outer and inner layers to form a semi-elastic cushion, to avoid rigidity and conform better to the surfaces of the beam-heads. The several layers of this let-off friction strap or brake are secured to each other at two or more points to cause them to operate conjointly.

For the purpose of lubricating this let-off friction device, and preventing undue wear upon its bearing-surfaces, we make an orifice through the strap or brake, as seen at D, through which powered soap-stone, carburet of iron, or black-lead, &c., may be introduced between the bearing-surfaces of the beam-head and friction strap or brake, and the opening closed by a pivoted cap, as seen in the figures.

In practical use this improvement may be attached to, and used in, looms, with any of the well-known let-off devices, or as more particularly described in our Letters Patent dated March 30, 1875, and No. 161,443.

Its application as a brake for other purposes would be equally advantageous, and the method of adapting it for such purposes would require only ordinary mechanical skill. Of course the inner strap can be used, with proper connections at the ends, independent of the other layers, with the same general result as to clogging, and may be made of flexible strips of wood bent around, or otherwise, and the orifice through the strap or brake saves the time and trouble of moving it off and on for lubricating.

Having thus described our improved let-off friction strap or brake for looms, &c., we claim—

1. A three-ply let-off friction strap or brake consisting of an inner flexible layer of wood, or any kindred non-conducting material, and an outer flexible layer of iron, or any material of suitable strength, and an interposed rubber or elastic layer, substantially as and for the purposes set forth.

2. A let-off friction-strap provided with an orifice and chamber for the introduction of and carrying the powdered soap-stone, &c., for feeding and keeping the surfaces between the strap and friction-roll in a continuous, proper, and uniform frictional condition, as set forth.

GEO. P. ROSE.
    ABEL CARTWRIGHT.
    BENONI S. ROSE.

Witnesses:
 J. G. PERRY,
 BENJN. W. CASE.